United States Patent [19]

Chekirda et al.

[11] 4,267,999
[45] May 19, 1981

[54] SUPPORT ASSEMBLY FOR VEHICLE SEAT

[75] Inventors: Russell F. Chekirda; Randall T. Murphy, both of Morristown, Tenn.; Walter Lyszczarz, Warren, Mich.

[73] Assignee: Lear Siegler, Inc., Troy, Mich.

[21] Appl. No.: 781,248

[22] Filed: Mar. 25, 1977

Related U.S. Application Data

[63] Continuation-in-part of Ser. No. 729,735, Oct. 5, 1976, abandoned.

[51] Int. Cl.[3] ............................................ F16M 13/00
[52] U.S. Cl. .................................... 248/418; 248/425
[58] Field of Search .................. 188/77; 108/139–142; 248/415–418, 425, 231, 74 B; 297/349

[56] References Cited

U.S. PATENT DOCUMENTS

| | | | |
|---|---|---|---|
| 257,733 | 5/1882 | Massey | 188/77 R |
| 1,951,375 | 3/1934 | Schwarzkopf et al. | 248/418 X |
| 1,951,508 | 3/1934 | Emmert | 248/418 X |
| 2,435,754 | 2/1948 | Roth | 188/77 R |
| 2,958,341 | 11/1960 | Grob | 188/77 R X |
| 3,135,550 | 6/1964 | Bosack | 297/349 X |
| 3,188,043 | 6/1965 | Dlouhy et al. | 248/418 X |
| 3,858,834 | 1/1975 | Eimen | 248/418 |
| 3,897,857 | 8/1975 | Rodaway | 188/77 W X |
| 3,926,396 | 12/1975 | Hall et al. | 248/418 |
| 3,931,949 | 1/1976 | Waligorski et al. | 248/418 |

FOREIGN PATENT DOCUMENTS

| | | | |
|---|---|---|---|
| 228980 | 7/1960 | Australia | 188/77 R |
| 852837 | 11/1939 | France | 188/77 R |
| 191378 | 6/1937 | Switzerland | 188/77 R |
| 287185 | 11/1952 | Switzerland | 188/77 R |

*Primary Examiner*—Lawrence J. Staab
*Attorney, Agent, or Firm*—Reising, Ethington, Barnard, Perry & Brooks

[57] ABSTRACT

A vehicle seat support assembly including an overcenter locking mechanism with a flexible metallic band wrapped about a floor mounted support tube and connected to a seat support frame pivotal on the tube such that tensioning of the band in an overcenter manner selectively prevents pivotal seat frame movement. A locking member of the mechanism is pivotally supported on the frame for rotation about a first axis and pivotally supports one end of a link about a movable second axis with another end of the link connected to one end of the band. In a locking position of the mechanism, the ends of the link are overcenter with respect to the first axis to provide the band tensioning and consequent prevention of seat frame pivoting. A curved intermediate portion of the link between its ends extends around a pin that supports the locking member on the frame. One preferred embodiment has its link provided with upper and lower link portions between which the other end of the band extends for connection to the seat frame, and a tensioner is provided for clamping a bight section of the band to provide proper band tension in the locking position. In another preferred embodiment, the link extends through an opening in the other band end and is connected to the seat frame by a tensioner having a pivotal lever. Both preferred embodiments have a manually actuated handle that moves the locking member and concomitantly moves a cooperable pawl on the seat frame into and out of engagement with the support tube. A mounting and thrust plate construction cooperates with the upper tube end in mounting the seat frame and limiting pivotal seat frame movement.

20 Claims, 7 Drawing Figures

SUPPORT ASSEMBLY FOR VEHICLE SEAT

This application is a continuation-in-part of U.S. States patent application Ser. No. 729,735, filed Oct. 5, 1976, now abandoned and assigned to the assignee of the present invention.

BACKGROUND OF THE INVENTION

1. Field of the Invention

This invention relates to a vehicle seat support assembly with a locking mechanism for selectively preventing or allowing pivotal movement of a seat frame.

2. Description of the Prior Art

Current van type vehicles include seat support assemblies having seat frames that are pivotal on associated floor mounted support tubes for movement between a forwardly facing position and a position to the side and/or to the rear. Pivotal movement of the seat frame from the forwardly facing position to the side allows a seat occupant convenient access upon assuming a seated position and upon leaving the seat through an adjacent side door. Likewise, pivotal movement of the seat between the forwardly facing position and the rearwardly facing position allows a seat occupant to either view the roadway being traveled on or to view the vehicle area rearward of the seat. Locking mechanisms are utilized to lock the seat in either its forwardly or rearwardly facing position. Normally, there is no requirement to lock the seat in its position facing to the side since the seat is not used in this orientation during vehicle travel but rather only during the time in which an occupant is sitting down on or getting up from the seat. Seats of this type are quite often referred to as "pedestal" seats and are utilized widely in motor homes as well as the smaller van type vehicles.

Seats generally like those described above are disclosed by U.S. Pat. Nos. 3,195,848; 3,508,733; 3,758,063; 3,858,834; 3,868,084; 3,873,054; 3,885,764; and 3,926,396.

SUMMARY OF THE INVENTION

An object of the present invention is to provide a vehicle seat support assembly including an improved locking mechanism for selectively preventing or allowing pivotal movement of a seat support frame.

In carrying out the above object and other objects of the invention, two preferred embodiments of the support assembly each include a floor support tube that extends upwardly in a vertical direction and a seat support frame pivotally mounted on the support tube for movement that changes the orientation of a seat supported thereby with respect to the associated vehicle. The locking mechanism of each assembly includes an elongated generally flexible band having opposite ends and an intermediate portion that extends about the tube. A locking member pivotally supported on the seat frame about a first axis supports one end of a link for pivotal movement about a movable second axis, while the other end of the link is connected to one end of the band. The other end of the band is connected to the seat frame so that a handle can pivot the locking member to a locking position where the ends of the link are over-center with respect to the first axis so as to tension the band about the tube and thereby prevent pivotal movement of the seat frame. Handle movement away from the locking position to a nonlocking position reduces the band tension so as to allow the seat frame pivoting.

An adjustable tensioner of one embodiment includes a pair of clamping members between which a bight section of the intermediate band portion is received and clamped to properly control band tension in the locking position. A threaded member extends through the band bight section between the clamping members to provide the clamping. Pointed formations in the closed end of the bight section provide reinforcement of the band to ensure operability of the tensioner. Band tension is maintained sufficient to prevent seat frame pivoting.

An adjustable tensioner of the other embodiment includes a lever pivoted on the seat frame and secured to the other end of the band opposite the band end connected to the link. Adjustment of a threaded member that engages the lever properly tensions the band in the locking position.

Both embodiments of the band tensioner provide sufficient band tension in the locking position to prevent seat frame pivotal movement while still allowing a biasing spring to move the locking mechanism to the locking position. Preferably, the biasing spring is of the helical type and extends between the locking member and the seat frame to provide its biasing action. Both embodiments also have the link interconnecting the locking member and the band provided with a curved intermediate portion extending around the first axis on which the locking member is supported for movement about the frame. A vertically extending pin supported by the frame mounts the locking member with the link extending about the pin. One embodiment of the link includes upper and lower link portions between which the band end connected to the seat frame extends so that the band is wrapped about the tube for about 270°. This embodiment also has its locking member including upper and lower portions pivoted to the upper and lower link portions and to the seat frame by the vertically extending pin. A connecting web of the locking member extends between its upper and lower portions and is engaged by a frame mounted stop in the locking position to prevent locking member movement under the impetus of band tension. In the other embodiment, the band end secured to the seat frame by the lever type tensioner includes an opening through which the link extends to permit the 270° band wrap angle about the support tube. An adjustable stop on the frame engages the locking member of this embodiment in the locking position to prevent its movement by the tensioned band.

Both embodiments incorporate a pawl that cooperates with the band to prevent seat movement. Each pawl is moved to a locking position within a tube opening through an aligned band opening at the same time the locking member is moved to its locking position. The pawl is pivoted on the seat frame in one embodiment and has an opening receiving an actuating portion of the handle which is fixed on the locking member so that handle movement also moves the pawl between its locking position and a non-locking position. In the other embodiment, the pawl is fixed on the locking member and moved therewith by the handle which is also fixed on the associated locking member.

The preferred support assembly construction of both embodiments includes upper and lower horizontally extending seat frame members between which the locking mechanism is received, with the vertical pin about which the locking member pivots extending between the vertically spaced frame members. The upper and lower seat frame members are pivotally mounted on the upper end of the support tube so as to mount the seat frame for pivotal movement. A thrust plate on the upper tube end cooperates with a mounting plate secured to the upper frame so as to support the seat frame against vertical movement. A positioning lug of the thrust plate extends upwardly and engages spaced stop surfaces carried by the seat frame to limit pivotal movement of the seat. In one embodiment the mounting plate is positioned on the upper side of the upper seat frame member and defines the stop surfaces. In the other embodiment the mounting plate is positioned on the lower side of the upper frame member and the stop surfaces are defined by the upper frame member.

The objects, features and advantages of the present invention are readily apparent from the following detailed description of the preferred embodiments taken in connection with the accompanying drawings.

DETAILED DESCRIPTION OF THE PREFERRED EMBODIMENTS

Figure 1:
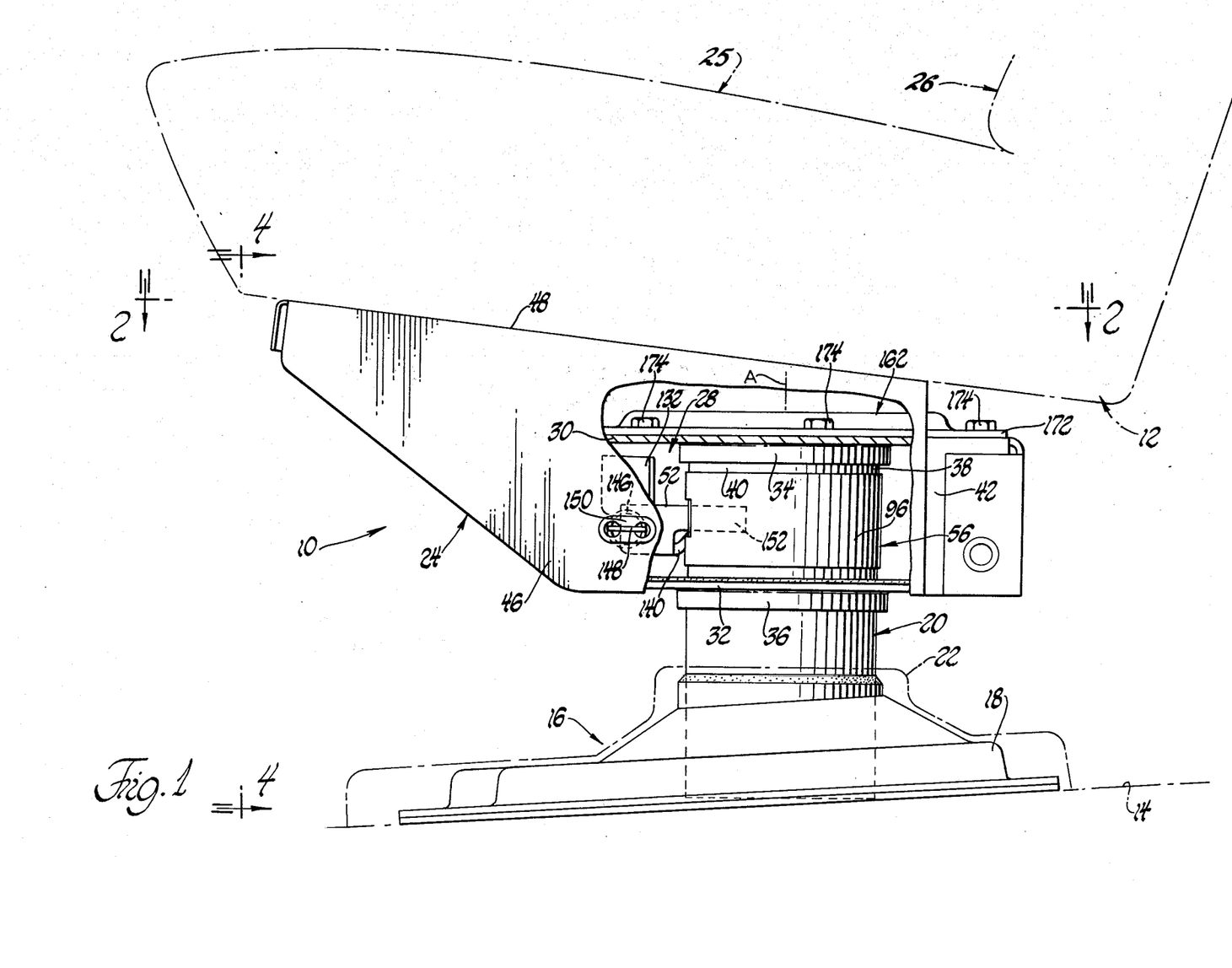
FIG. 1 is a partially broken away side elevation view of one preferred embodiment of a vehicle seat support assembly constructed according to the present invention.

Referring to FIG. 1 of the drawings, one embodiment of a vehicle seat support assembly constructed according to the present invention is collectively indicated by reference numeral 10 and is utilized to support a seat 12 on a vehicle floor 14. A lower support 16 of the support assembly includes a floor mounted base 18 and an upwardly extending support tube 20 mounted on the base. A plastic trim cover 22 shown by phantom lines is utilized to enclose the support base 18 in a manner that gives the support an aesthetically appealing appearance. A seat support or support frame 24 of the support assembly is pivotally mounted on the support tube 20 for movement about a generally vertical axis A to change the orientation of the seat 12 supported thereby. Consequently, the seat 12 can be positioned with its horizontal seat cushion 25 and its seat back 26 facing in forward, sideways and/or rearward directions with respect to the associated vehicle in which the support assembly is mounted. An overcenter locking mechanism generally indicated by 28 is utilized to selectively secure the seat frame 24 with the seat 12 in either its forwardly or rearwardly facing direction or to allow movement between these positions.

Figure 4:
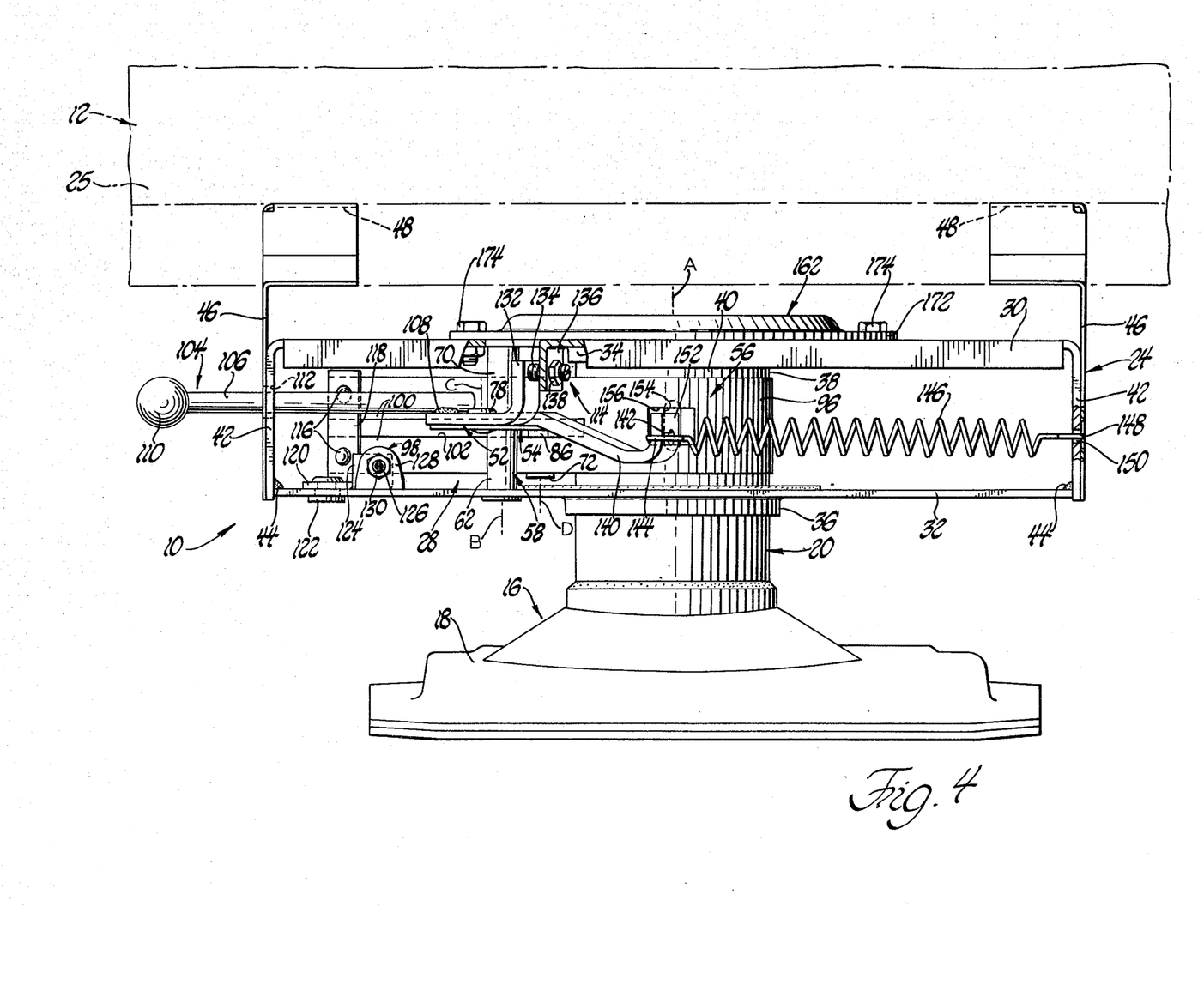
FIG. 4 is an elevation view taken along line 4—4 of FIG. 1 looking rearwardly at the support assembly from the front.
Figure 5:
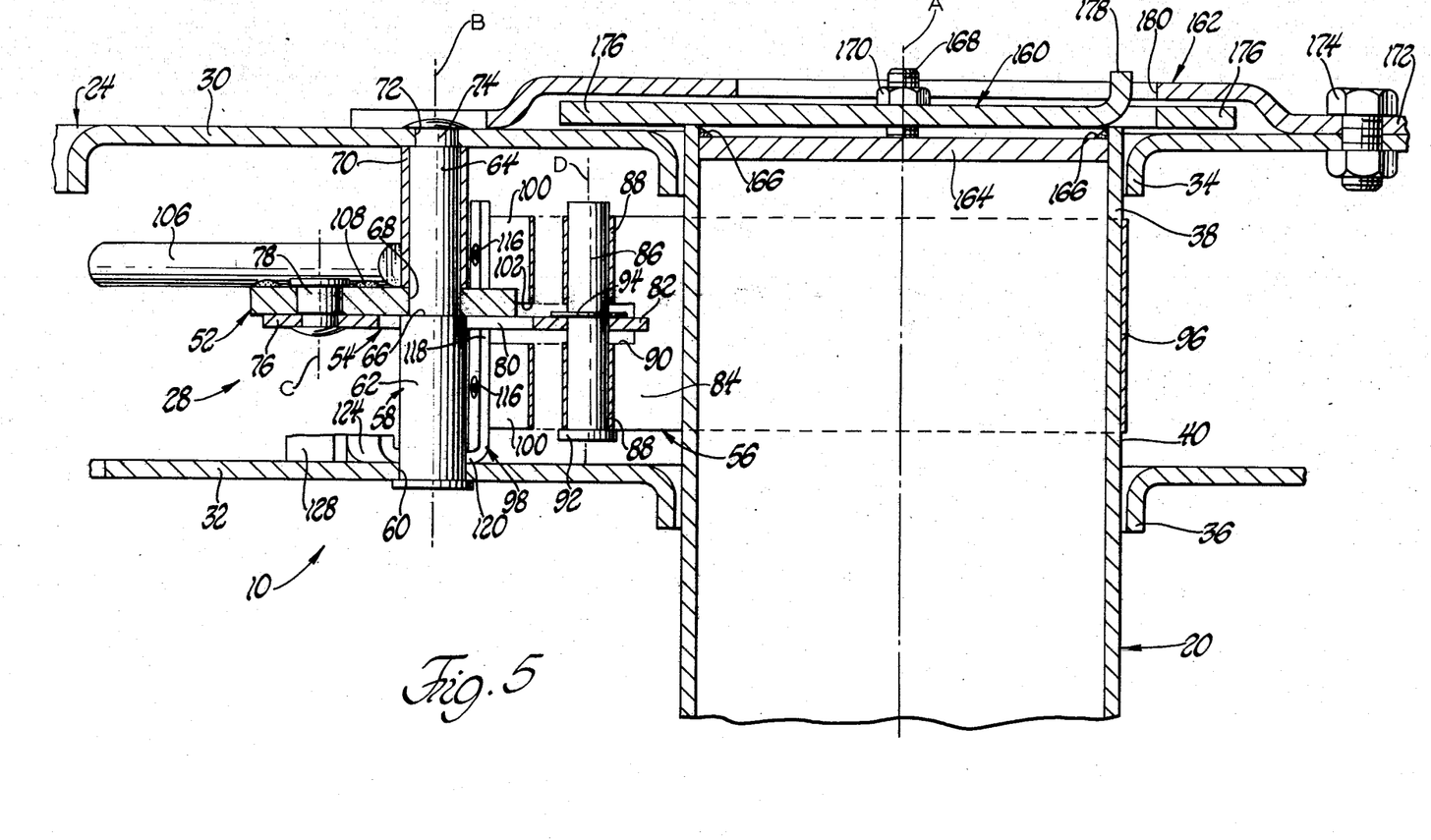
FIG. 5 is a sectional view taken along line 5—5 of FIG. 2 through the support assembly.

As can be seen in FIG. 5, the locking mechanism 28 is located vertically between upper and lower horizontally extending frame members 30 and 32 of seat frame 24. Downwardly extending annular flanges 34 and 36 of the upper and lower frame members 30 and 32, respectively, define openings that receive an upper end 38 of the support tube 20. A round outer surface 40 of the upper support tube end engages the seat frame flanges 34 and 36 to pivotally support the seat frame for movement about axis A. As can be seen in FIG. 4, the upper seat frame member 30 includes downwardly extending side flanges 42 that are secured to opposite sides of the lower seat frame member 32 in any suitable manner such as by welds 44. Seat mounting brackets 46 are secured to the outer sides of side flanges 42 in any suitable manner and have upper mounting flanges 48 (see also FIG. 2) on which the seat can be mounted and secured by the use of attachment bolts extending through holes 50 in the mounting flanges. Also, if the seat is to be utilized for a driver's seat, a forwardly and rearwardly movable seat adjuster may be mounted on the mounting flanges 48 so as to support the forwardly facing seat for longitudinal movement with respect to the vehicle in a manner that allows the driver proper positioning with respect to the vehicle controls.

Figure 2:
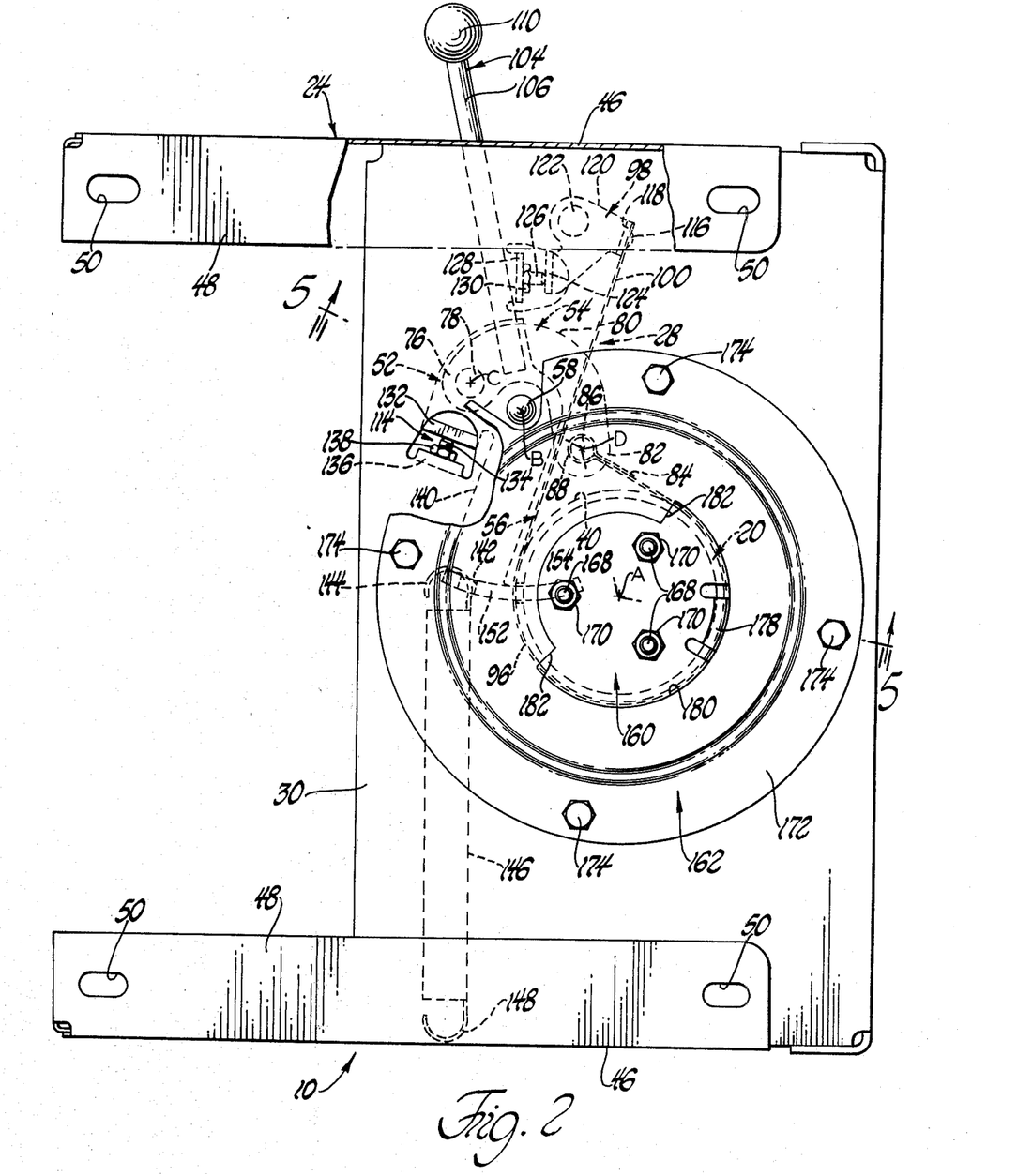
FIG. 2 is a top plan view of the support assembly taken along line 2—2 of FIG. 1 and shows an overcenter locking mechanism in a locking position so as to prevent pivotal movement of a seat frame of the assembly.
Figure 3:
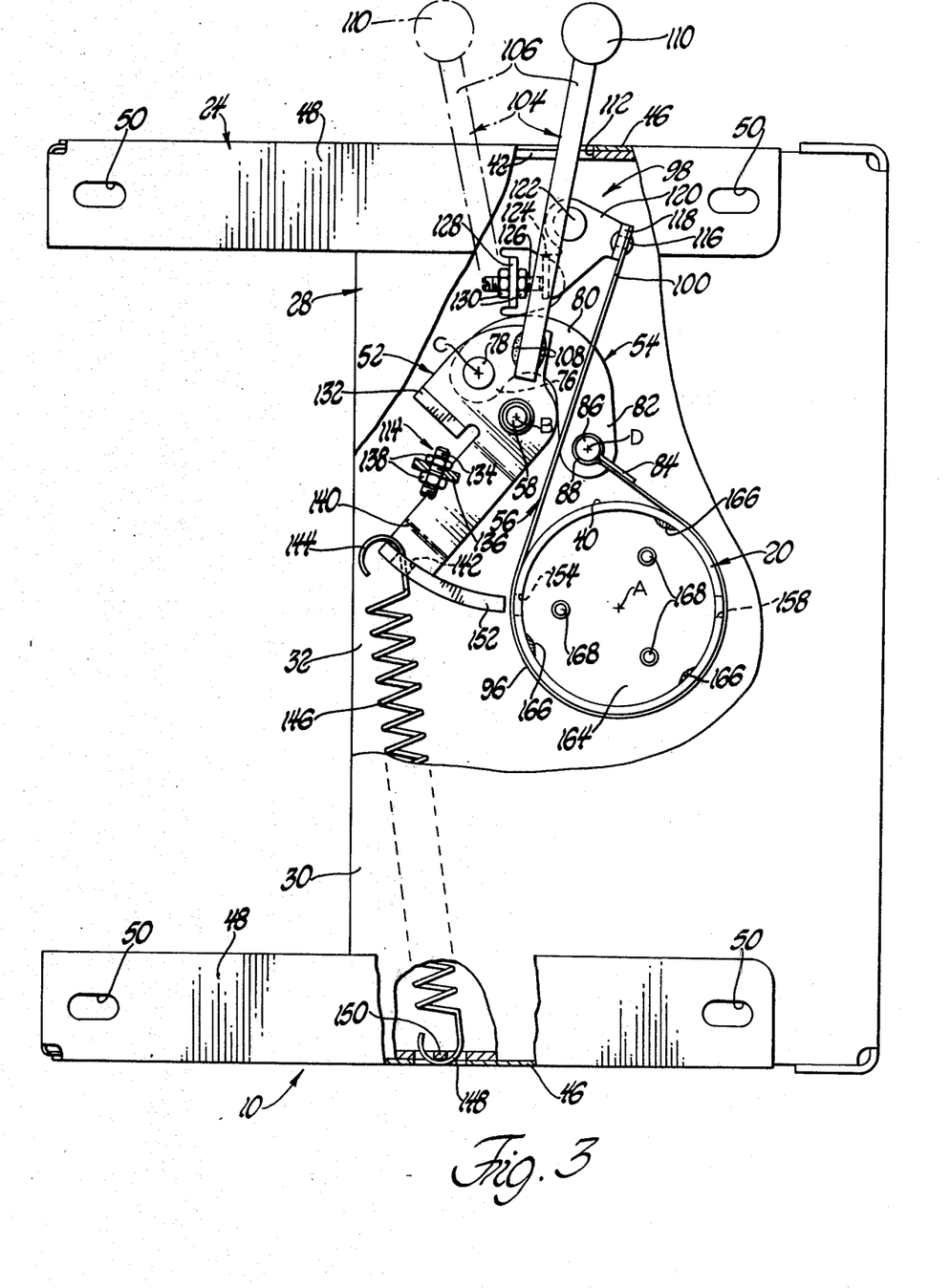
FIG. 3 is a partially broken away view taken in a direction similar to FIG. 2, but shows the locking mechanism in a nonlocking position where the seat frame movement is permitted.

With reference to FIGS. 2-4, the locking mechanism 28 is located between the upper and lower seat frame members 30 and 32 and is movable between a locking position shown in FIG. 2 and a nonlocking position shown in FIG. 3 so as to selectively prevent or allow pivotal movement of the seat frame 24 on support tube 20. Components of the locking mechanism include a locking member 52, a gooseneck link 54, and a generally flexible metallic band 56 that is wrapped around the support tube 20 in engagement with its outer surface 40 for approximately three-quarters of a turn, i.e. 270°. Locking member 52 is pivotally supported on the seat frame 24 about an axis B by a pin 58 best seen in FIG. 5. An opening 60 in the lower seat frame member 32 receives pin 58 as it is inserted upwardly during assembly. Between large and small diameter portions 62 and 64 of pin 58, an upwardly facing annular pin ledge 66 seats against the bottom side of locking member 52 with an opening 68 of the locking member receiving the small diameter portion above the ledge. A sleeve 70 receives the small diameter pin portion 64 and seats against the upper side of the locking member 52 about its opening 68 and against the lower side of the upper frame member 30. An opening 72 in the upper frame member 30 receives an upward projection 74 of pin portion 64 and this projection is headed over the upper side of the frame member 30 during assembly so as to secure the pin 58 in its relationship shown in FIG. 5 such that the locking member 52 is pivotal about axis B.

As seen by combined reference to FIGS. 3 and 5, gooseneck link 54 includes a first end 76 that is pivotally supported on locking member 52 about an axis C by a pin 78. Axis C moves during movement of locking member 52 about axis B between the locking position of FIG. 2 and the nonlocking position of FIG. 3. A curved intermediate portion 80 of link 54 extends around the support pin 58 at axis B between link end 76 and another link end 82. One end 84 of band 56 is connected to link end 82 by a pin 86 with a central axis D. Band end 84 includes upper and lower portions 88 (FIG. 5) and an intermediate slot 90 that receives link end 82. Each band end portion 88 forms a round loop encircling the pin 86 and is secured to itself in any suitable manner such as by welding or a rivet. A lower pin head 92 engages the lower band end portion 88 to prevent upward pin movement. Likewise, annular clip 94 received within band end opening 90 has suitable friction teeth, not shown, engaged with pin 86 so that the clip seats against the upper side of link end 82 in order to prevent downward pin movement. From its end 84, band 56 includes an intermediate portion 96 which is wrapped about the outer support tube surface 40 for about three-quarters of a turn and then extends toward a tensioner 98 that connects another band end 100 to the seat frame in a manner that is more fully hereinafter described. The curved intermediate link portion 80 (FIG. 3) extends through an elongated opening 102 (FIG. 4) in the band end 100 so that the band 56 can be wrapped about the support tube 20 in the manner shown.

As seen in FIG. 3, a handle 104 of the locking mechanism includes a rod 106 with an inner end secured to locking member 52 by welds 108 and an outer end that supports a knob 110. Between its inner and outer ends, handle rod 106 extends through aligned openings 112 in the adjacent upper seat frame member side flange 42 and its associated seat mounting bracket 46. A person desiring to operate the locking mechanism 28 grasps the knob 110 to move handle 104 from its phantom line indicated locking position to its solid line indicated nonlocking position of FIG. 3.

As the locking mechanism 28 is moved from its FIG. 3 nonlocking position to its FIG. 2 locking position, the locking member 52 is pivoted counterclockwise about axis B so that movable link pin axis C pivots in a counterclockwise direction. This pin movement causes a pulling action on the band 56 to take place as the link 52 moves toward an overcenter position where a line between its end pin axes C and D is located below axis B in an overcenter relationship. Consequently, band tension generated by the movement of locking member 52 then tends to rotate the locking member counterclockwise about axis B into engagement with an adjustable stop 114 so that the locking mechanism is maintained in its locking position with the band tension about the support tube preventing pivotal movement of seat frame 24. Unlocking of the locking mechanism 28 proceeds by manual clockwise rotation of handle 104 from the FIG. 2 position toward the solid line position of FIG. 3. As the line between the link and end pin axes C and D moves about axis B, the pulling action on the link from the band tension causes locking member 52 to then be pulled in a clockwise direction about axis B to complete the unlocking. The tension of band 56 is reduced in the nonlocking position relative to the locking position so that the seat frame movement about the support tube can take place.

As seen by combined reference to FIGS. 3 and 4, band end 100 is secured above and below its opening 102 by a pair of rivets 116 to a vertical leg 118 of a lever 120 that constitutes a component of the band tensioner 98. A pin 122 (FIG. 3) pivotally supports the lever 120 on the upper side of lower seat frame member 32 for movement about a vertical axis. Another vertical leg 124 of lever 120 is engaged by one end of an adjustable screw member 126 to pivotally locate the lever so that band 56 has the proper tension in the locking position. Screw member 126 is threaded through an upward projection 128 in the lower seat frame member 32 and is secured in the proper position after threading adjustment by the cooperable action of a pair of nuts 130, one of which is welded to one side of the projection and the other of which functions as a jam nut on the opposite side of the projection. Thus, when the locking mechanism 28 is in its FIG. 2 locking position, screw member 126 is adjusted to pivot lever 120 counterclockwise in order to increase the tension of band 56 sufficiently to prevent seat frame movement. Similarly, the screw member 126 is adjusted to allow clockwise pivoting of lever 120 if the band has too short an effective length to permit the mechanism to be moved into its overcenter locking position.

Locking member 52, as can be seen in FIGS. 2-4, includes a stop leg 132 that engages an adjustable screw member 134 of stop 114 in the FIG. 2 locking position to limit counterclockwise rotation of the locking member about axis B. Screw member 134 is threaded through a downward projection 136 of the upper seat frame member 30 and after being threadedly adjusted in the proper location is secured by a pair of nuts 138 (FIG. 3) one of which is welded to one side of the projection and the other of which functions as a jam nut on the opposite side of the projection. The stop 114 is adjusted so that locking member 52 positions link 54 in its overcenter relationship sufficiently to maintain the locking mechanism in its locking position without moving too far into this relationship so that the band tension is reduced sufficiently to permit seat frame pivoting. In addition to stop leg 132, locking member 52 also includes a spring leg 140 that has an opening 142 for securing one hooked end 144 of a helical spring 146. Another hooked end 148 of spring 146 is hooked over a tab 150 (FIG. 3) of the upper seat frame member side flange 42 opposite the one through which the handle 104 extends outwardly for manual actuation. Spring 146 biases locking member 52 in a counterclockwise direction with a sufficient force to automatically lock the mechanism.

Locking member 52 also includes a curved pawl 152 (FIG. 3) on the outer end of its spring leg 140. In the locking position with the seat facing forwardly, the pawl 152 is received within an opening 154 in support tube 20 and extends through an aligned opening 156 (FIG. 4) in the intermediate portion of band 56. Pawl 152 thus cooperates with the tensioned band 56 in order to position the seat in its forwardly facing position. Similarly, a second opening 158 (FIG. 3) in the support tube permits the pawl 152 to be inserted into the tube to cooperate with the band in positioning the seat frame in a rearwardly facing orientation. Biasing spring 146 slidably engages the end of pawl 152 with the outer tube surface 40 within band opening 156 as the seat is pivoted between forwardly and rearwardly facing positions with the mechanism unlocked. Support tube 20 may have other openings for receiving the pawl to position the seat frame in various other orientations. Pawl 152 can also be eliminated so that the seat frame 24 can be secured by the locking mechanism 28 in an infinite number of positions.

Pivoting movement of the seat frame 24 is limited in the embodiment disclosed by the cooperable action of a thrust plate 160 and a mounting plate 162 best shown in FIGS. 2 and 5. An end plate 164 (FIG. 5) is received within the upper tube end 38 and secured in position by welds 166 so that threaded studs 168 of this plate extend upwardly through openings in the thrust plate 160 with nuts 170 securing the thrust plate in position on the tube. The mounting plate 162 includes a generally annular edge 172 that is secured to the upper side of upper seat frame member 30 by nut and bolt connections 174 with an annular portion 176 of the thrust plate located between the upper seat frame member and the mounting plate. The thrust plate and the mounting plate thus cooperate with the upper seat frame member to limit the vertical movement of the seat frame in both the upward and downward direction on support tube 20. A positioning lug 178 of thrust plate 160 extends upwardly into an opening 180 of mounting plate 162. During pivotal seat frame movement, spaced stop surfaces 182 (FIG. 2) of mounting plate opening 180 move toward and away from the positioning lug 178. The cooperable action of positioning lug 178 and the stop surfaces 182 positions the seat frame in its proper location for both the forwardly and rearwardly facing positions of the seat so that the locking mechanism pawl 152 (FIG. 3) can move into the appropriate support tube opening 154 or 158 as the locking mechanism is locked to prevent subsequent seat pivoting.

With the locking mechanism 28 in its locking position of FIG. 2 and the seat frame 24 facing forwardly to the left as shown in this view, frontal vehicle declaration forces acting on the locking member 52, the link 54, and the handle 104 increase the engagement force between the locking member stop leg 132 and the adjustable stop member 134 of stop 114.

Figure 6:
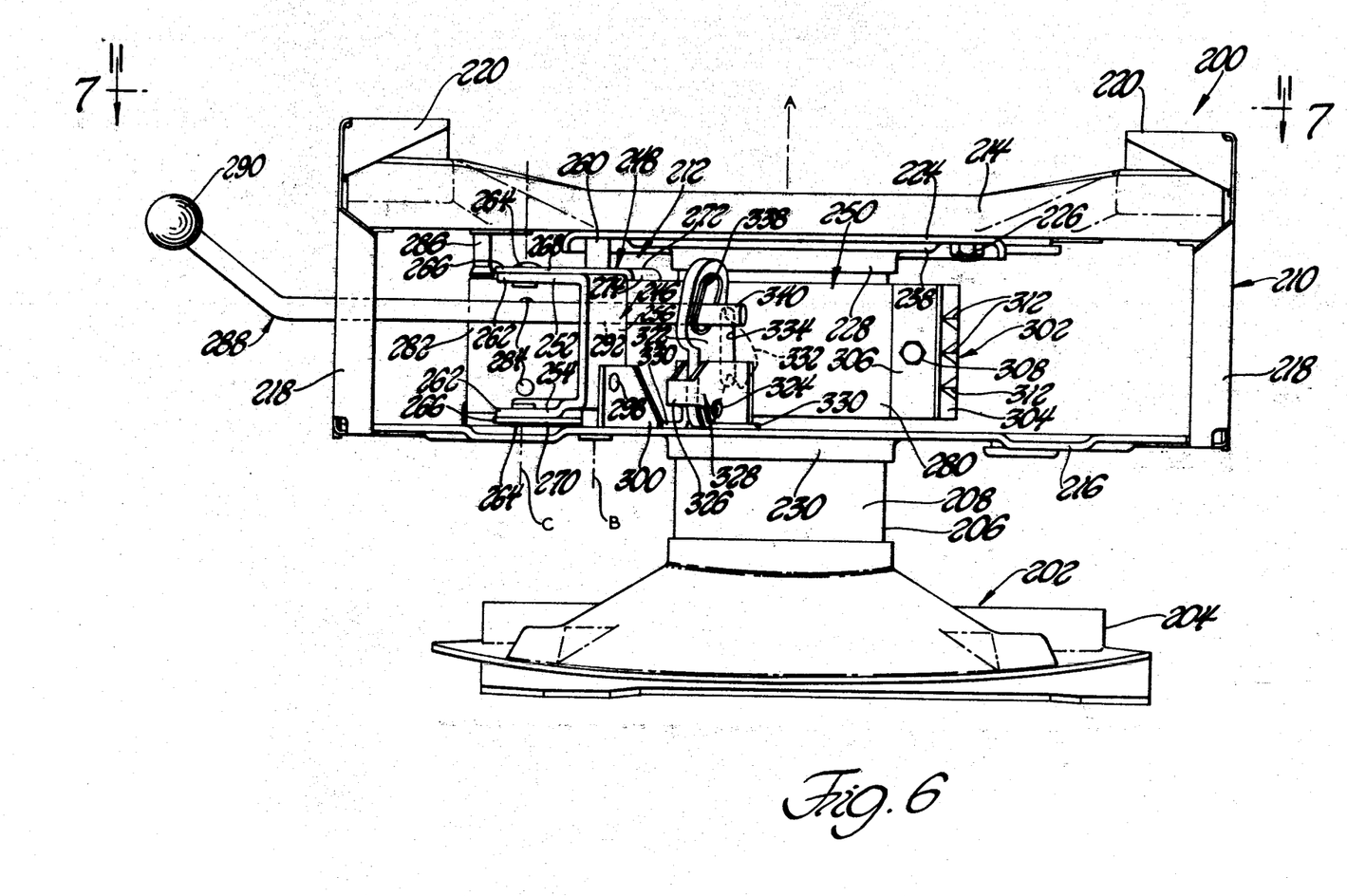
FIG. 6 is a front elevation view of another preferred embodiment of a vehicle seat support assembly constructed according to the present invention.
Figure 7:
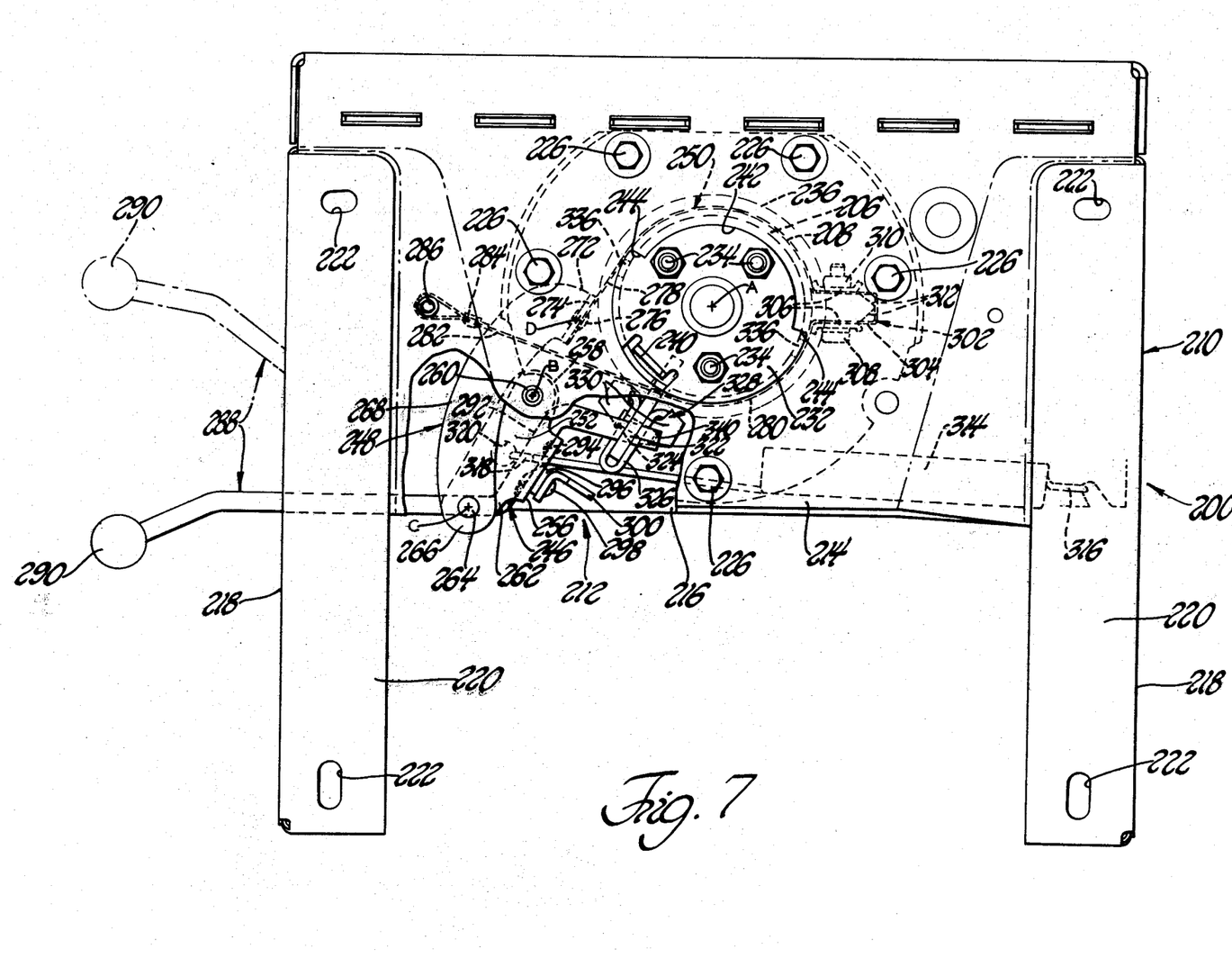
FIG. 7 is a top plan view of the support assembly taken along line 7—7 of FIG. 6.

With reference to FIGS. 6 and 7, another embodiment of a vehicle seat support assembly constructed according to the present invention is indicated by 200 and is utilized to support a seat on a vehicle floor in a manner similar to the previously described support assembly. A lower support 202 of the assembly is shown in FIG. 6 as including a base 204 that is designed to be mounted on the floor of an associated vehicle. A support tube 206 of support 202 extends upwardly from the base 204 and has a round outer surface 208. Seat support assembly 200 also includes a seat support or support frame 210 on which a cushioned vehicle seat is to be supported. Seat frame 210 is pivotally movable on the support tube 206 about an axis A through the center of the tube. Positioning of the seat is thus possible with the seat facing in forward, sideways, and/or rearward directions with respect to the associated vehicle. An overcenter locking mechanism indicated generally by 212 is utilized to selectively position the seat frame 210 in different pivotal positions as desired by the seat occupant.

Locking mechanism 212 of the FIGS. 6 and 7 support assembly is positioned between upper and lower frame members 214 and 216 of the seat frame 210. Side frame members 218 seen in FIG. 6 extend between the upper and lower frame members 214 and 216 and have upper ends provided with mounting flanges 220 on which the associated seat is to be mounted. Bolt mounting opening 222 in opposite ends of these flanges are shown in FIG. 7 and utilized to secure the seat to the seat frame during an assembly operation.

A mounting plate 224 shown in FIGS. 6 and 7 is secured to the lower side of upper frame member 214 by nut and bolt connections 226 and has an annular flange 228 (FIG. 6) projecting downwardly and receiving the support tube 206. Lower frame member 216 has an integral annular flange 230 which projects downwardly so that the support tube 206 projects upwardly therethrough with its outer surface 208 slidably engaged with the inner surfaces of flanges 228 and 230 to provide the pivotal support about the central tube axis A. A thrust plate 232 shown in FIG. 7 is secured by stud and nut connections 234 to an unshown plate welded within the upper end of tube 206 and has a round periphery 236 shown by hidden line representation. This thrust plate periphery is received between the lower side of the upper frame member 214 and an annular depression 238 (FIG. 6) in the mounting plate 224 which depression extends about the annular flange 228 that receives the support tube. Cooperable action between the upper frame member 214, mounting plate 224, and thrust plate 232 thus limits vertical movement of the seat frame 210 on the support tube 206. A positioning lug 240 of thrust plate 232 extends upwardly through an opening 242 in upper frame member 214 as seen in FIG. 7 and is engaged with spaced stop surfaces 244 of the opening to limit the pivotal seat frame movement. As shown in FIG. 7, the seat frame 210 is located in a sideways facing direction and is pivotal therefrom 90° in either direction to forwardly and rearwardly facing positions where the lug 240 engages one or the other of the stop surfaces 244 to prevent further pivoting.

Locking mechanism 212 is located between the upper and lower frame members 214 and 216 and includes a locking member 246, a curved link 248, and a generally flexible metallic band 250 that is wrapped about the outer support tube surface 208 for three quarters of a turn, i.e. 270°. Locking member 246 is of a unitary construction including upper and lower portions 252 and 254 that are interconnected by a connecting web 256 as best seen in FIG. 6. Each locking member portion 252 and 254 has a first end 258 (FIG. 7) pivotally supported by a pin 260 that extends between the upper and lower frame members along an axis B. Second ends 262 of each upper and lower locking member portion 252 and 254 are pivotally connected by associated rivet pins 264 along a movable vertical axis C to first ends 266 on upper and lower link portions 268 and 270 of link 248. Each upper and lower link portion 268 and 270 also has a second end 272 which is integrally connected to the second end of the other link portion by a vertically extending connecting web 274 in a unitary manner. One or more rivets 276 secure the connecting web 274 to a first end 278 of band 250 along an axis D. An intermediate portion 280 of the band extends from its first end 278 about the outer tube surface 208 for approximately three quarters of a turn, i.e. 270°. From tube 206, the intermediate band portion 280 extends to a second end 282 which is received between the upper and lower link portions 268 and 270 of link 248. Rivets 284 form the second band end 282 into a loop which receives a pin 286 extending between the upper and lower frame members 214 and 216 so as to fix the band end to the seat frame.

A manual handle 288 extends outwardly from the locking mechanism 212 through a suitable opening in the left side frame member 218 and has a knob 290 on its outer end which is manually grasped to move the handle between the solid and phantom line indicated positions of FIG. 7. An inner end 292 of handle 288 is secured to the inner side of the connecting web 256 on the locking member by welds 294 so that the locking member is moved about the axis B concomitant with handle movement. In the locking position, the outer side of the locking member connecting web 256 is engaged with a pad 296 which is secured by a rivet 298 to a stop 300 that is welded to the lower frame member 216. Band 250 is tensioned in the locking position so as to engage the outer surface 208 of support tube 206 in a frictional locking manner that prevents pivotal movement of seat frame 210 about the central tube axis A. In the locking position, axis B is located upwardly and to the left of a line through axes C and D so that the link ends are in an overcenter relationship with respect to the locking member. As such, the band tension tends to pull on the link 248 so that the locking member 246 is urged in a counterclockwise direction against the stop pad 296 so as to maintain the locking member in the locking position. Movement of the handle 288 to the phantom line position shown in FIG. 7 pivots the locking member 246 clockwise about axis B so that the axis C moves upwardly and to the left of a line through axes B and D. Band 250 is then relieved of its tension so that the seat frame 210 can pivot about the support tube 206 for adjusting movement to various positions.

a tensioner for band 250 is indicated generally by 302 and is located at a bight section 304 of the band. This bight section has a generally U shape as viewed in FIG. 7 opening toward the support tube 206 and having a closed end that projects radially in an outward direction from the central tube axis A. Clamping members 306 of tensioner 302 are located in a spaced relationship to each other and received the bight section 304 therebetween so as to clamp the bight section in an adjustable manner that controls the effective length of the band and, consequently, its tension in the locking position. A threaded bolt 308 extends through aligned openings in the clamping members 306 and the bight section 304 and is received by a nut 310 so as to draw the clamping members toward each other and thereby provide increased band tension in an adjustable manner. Pointed formations 312 in the closed end of bight section 304 provide a stengthening that prevents the bight section from collapsing during tensioning of the band. The open end of bight section 304 which opens inwardly toward axis A has a width that increases and decreases during the adjustable tensioning of the bight section by clamping members 206 and the pointed formations 312 thus ensure that the clamping members will be in full engagement with the sides of the bight section during this adjustment by preventing the collapse of the closed outer end on the bight section.

A helical spring 314 shown in FIG. 7 has a first end 316 hooked to the right side frame member 218 and a second end 318 hooked within a hole 320 in the locking member so as to normally bias the locking member counterclockwise about axis B to the locking position. Preferably, the adjustment of band 250 is maintained great enough in the locking position to always prevent pivotal seat frame movement but not so great as to prevent the spring 314 from moving the locking mechanism to the locking position unassisted by any manual effort. As the locking mechanism is moved to the nonlocking position in the manner previously discussed, spring 314 is tensioned and thereby provides for the return of the locking mechanism after the handle 288 is manually released.

A pawl 322 of support assembly 200 shown in FIGS. 6 and 7 is pivotally mounted by a pin 324 within a U section 326 of a pawl mount 328. Feet 330 of the pawl mount are welded or otherwise suitably secured to the lower frame member 216 of the seat frame so that the pawl is pivotally movable about the pin 324 toward and away from the intermediated band portion 280 and the support tube 206. A locking nose 332 of pawl 322 extends through an opening 334 (FIG. 6) in the intermediate band portion and through one of three circumferentially spaced openings 336 in the support tube so as to cooperate with the band in positioning the seat in either forward, sideways, or rearwardly facing directions. An elongated actuating opening 338 of pawl 322 is seen in FIG. 6 and receives a handle actuating portion 340 that moves the pawl between its locking position and a nonlocking position concomitant with the movement of locking mechanism 212 between the locking and nonlocking positions. Movement of the handle from the solid line indicated position of FIG. 7 to its phantom line indicated position pulls outwardly on the pawl 322 so that the handle actuating portion 340 slides from the lower end of actuating opening 338 to its upper end while pulling the pawl outwardly through the band and support tube openings to permit the seat frame pivoting as the band tension is released. When the pawl and band release the seat frame, the seat occupant can pivot the seat from the sideways facing direction of FIG. 7 in either direction to a forward or rearwardly facing position. During such pivoting with the handle released, the biasing action on locking member 246 by spring 314 causes the pawl to be urged inwardly by the handle actuating portion 340 within the band opening 334 and to slide against the outer support tube surface 208 and into one of the support tube openings 336 upon reaching the associated seat position where locking of both the pawl and the locking mechanism then occurs.

While preferred embodiments of the support assembly have herein been described in detail, those familiar with the art will recognize various alternative designs and embodiments for practicing the present invention as defined by the following claims.

What is claimed is:

1. In a vehicle seat support assembly including a floor support and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about one of the supports; overcenter locking means mounted on the other support and connected to the opposite ends of the band; said locking means being movable to move the mechanism between a first overcenter locking position where the band is tensioned about the one support to prevent pivotal movement of the seat mounting support and a second nonlocking position where the band tension is reduced relative to the locking position so as to allow the pivotal movement of the seat mounting support; and means for selectively moving the locking means to position the locking mechanism in either the locking or nonlocking position; the floor support including an upwardly projecting tube having a round outer surface about which the intermediate portion of the band extends; the seat mounting support including a seat frame on which the overcenter locking means is mounted; the locking means including a locking member pivotally supported on the frame about a first axis and also including a link having a first end pivoted to the locking member about a second axis and a second end connected to one end of the band; the seat frame including a stop that engages the locking member to position the mechanism in the locking position; and the stop including an adjustable member mounted on the seat frame and engaged with the locking member in an adjustable manner to adjustably control positioning of the locking mechanism in the locking position.

2. In a vehicle seat support assembly including a floor support and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about one of the supports; overcenter locking means mounted on the other support and connected to the opposite ends of the band; said locking means being movable to move the mechanism between a first overcenter locking position where the band is tensioned about the one support to prevent pivotal movement of the seat mounting support and a second nonlocking position where the band tension is reduced relative to the locking position so as to allow the pivotal movement of the seat mounting support; means for selectively moving the locking means to position the locking mechanism in either the locking or nonlocking position; the floor support including an upwardly projecting tube having a round outer surface about which the intermediate portion of the band extends; the seat mounting support including a seat frame on which the overcenter locking means is mounted; the locking means including a locking member pivotally supported on the frame about a first axis and also including a link having a first end pivoted to the locking member about a second axis and a second end connected to one end of the band; an adjustable tensioner for controlling the band tension when the locking mechanism is in the locking position; the tensioner including a lever pivoted on the frame and connected to the end of the band opposite to the end thereof connected to the link; and the tensioner also including an adjustable member for engaging and positioning the lever to thereby control the band tension in the locking position.

3. In a vehicle seat support assembly including a floor support and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about one of the supports; overcenter locking means mounted on the other support and connected to the opposite ends of the band; said locking means being movable to move the mechanism between a first overcenter locking position where the band is tensioned about the one support to prevent pivotal movement of the seat mounting support and a second nonlocking position where the band tension is reduced relative to the locking position so as to allow the pivotal movement of the seat mounting support; means for selectively moving the locking means to position the locking mechanism in either the locking or nonlocking position; the floor support including an upwardly projecting tube having a round outer surface about which the intermediate portion of the band extends; the seat mounting support including a seat frame on which the overcenter locking means is mounted; the locking means including a locking member pivotally supported on the frame about a first axis and also including a link having a first end pivoted to the locking member about a second axis and a second end connected to one end of the band; an adjustable tensioner for controlling the band tension when the locking mechanism is in the locking position; the intermediate portion of the band including a bight section of a U shape whose closed end projects away from the tube; the tensioner including means for clamping the intermediate portion of the band at the bight section to control tension of the band in the locking position.

4. In a vehicle seat support assembly including a floor support and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about one of the supports; overcenter locking means mounted on the other support and connected to the opposite ends of the band; said locking means being movable to move the mechanism between a first overcenter locking position where the band is tensioned about the one support to prevent pivotal movement of the seat mounting support and a second nonlocking position where the band tension is reduced relative to the locking position so as to allow the pivotal movement of the seat mounting support; means for selectively moving the locking means to position the locking mechanism in either the locking or nonlocking position; the floor support including an upwardly projecting tube having a round outer surface about which the intermediate portion of the band extends; the seat mounting support including a seat frame on which the overcenter locking means is mounted; the locking means including a locking member pivotally supported on the frame about a first axis and also including a link having a first end pivoted to the locking member about a second axis and a second end connected to one end of the band; an adjustable tensioner for controlling the band tension when the locking mechanism is in the locking position; the intermediate portion of the band including a bight section; the tensioner including means for clamping the bight section of the band to control the band tension in the locking position; the bight section of the band having a U shape whose closed end projects away from the tube and includes pointed formations; the clamping means including clamping members between which the bight section is received; and a threaded member extending between the clamping members to provide clamping thereof on the bight section of the band.

5. In a vehicle seat support assembly including a floor support including an upwardly projecting tube having a round outer surface and a seat mounting support including a seat frame pivotal on the floor support about a generally vertical axis to change the orientation of a seat supported thereby with respect to the associated vehicle, a locking mechanism comprising: an elongated generally flexible band having opposite ends and an intermediate portion that extends about the outer tube surface of the floor support; overcenter locking means mounted on the seat frame of the seat mounting and connected to the opposite ends of the band; said locking means including a locking member pivotally supported on the frame about a first axis, the locking means also including a link having a first end pivoted to the locking member about a second axis and a second end connected to one end of the band, and wherein the link includes a curved intermediate portion that extends around the first axis about which the locking member is pivoted to the frame, the locking means being movable to move the mechanism between a first overcenter locking position where the band is tensioned about the tube surface to prevent pivotal movement of the seat mounting support and a second nonlocking position where the band tension is reduced relative to the locking position so as to allow the pivotal movement of the seat mounting support; and means for selectively moving the locking means to position the locking mechanism in either the locking or nonlocking position.

6. In a vehicle seat support assembly including a floor support and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about one of the supports; overcenter locking means mounted on the other support and connected to the opposite ends of the band; said locking means being movable to move the mechanism between a first overcenter locking position where the band is tensioned about the one support to prevent pivotal movement of the seat mounting support and a second nonlocking position where the band tension is reduced relative to the locking position so as to allow the pivotal movement of the seat mounting support; means for selectively moving the locking means to position the locking mechanism in either the locking or nonlocking position; the floor support including an upwardly projecting tube having a round outer surface about which the intermediate portion of the band extends; the seat mounting support including a seat frame on which the overcenter locking means is mounted; the locking means including a locking member pivotally supported on the frame about a first axis and also including a link having a first end pivoted to the locking member about a second axis and a second end connected to one end of the band; and the other end of the band including an opening through which the link extends for connection to the seat frame.

7. In a vehicle seat support assembly including a floor support and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about one of the supports; overcenter locking means mounted on the other support and connected to the opposite ends of the band; said locking means being movable to move the mechanism between a first overcenter locking position where the band is tensioned about the one support to prevent pivotal movement of the seat mounting support and a second nonlocking position where the band tension is reduced relative to the locking position so as to allow the pivotal movement of the seat mounting support; means for selectively moving the locking means to position the locking mechanism in either the locking or nonlocking position; the floor support including an upwardly projecting tube having a round outer surface about which the intermediate portion of the band extends; the seat mounting support including a seat frame on which the overcenter locking means is mounted; the locking means including a locking member pivotally supported on the frame about a first axis and also including a link having a first end pivoted to the locking member about a second axis and a second end connected to one end of the band; and the link including upper and lower link portions between which the other end of the band extends for connection to the seat frame.

8. In a vehicle seat support assembly including a floor support including an upwardly projecting tube having a round outer surface, and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about the outer tube surface of the floor support; overcenter locking means mounted on the seat frame of the seat mounting support and connected to the opposite ends of the band; said locking means including a locking member pivotally supported on the frame about a first axis, the locking means also including a link having a first end pivoted to the locking member about a second axis and a second end connected to one end of the band, the locking means being movable to move the mechanism between a first overcenter locking position where the band is tensioned about the tube surface to prevent pivotal movement of the seat mounting support and a second nonlocking position where the band tension is reduced relative to the locking position so as to allow the pivotal movement of the seat mounting support; means for selectively moving the locking means to position the locking mechanism in either the locking or nonlocking position; and a pawl mounted on the seat frame and selectively movable between locking and nonlocking positions with respect to the support tube by movement of the locking member so as to cooperate with the band in preventing movement of the seat frame about the support tube.

9. In a vehicle seat support assembly including a floor support and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about one of the supports; overcenter locking means mounted on the other support and connected to the opposite ends of the band; said locking means being movable to move the mechanism between a first overcenter locking position where the band is tensioned about the one support to prevent pivotal movement of the seat mounting support and a second nonlocking position where the band tension is reduced relative to the locking position so as to allow the pivotal movement of the seat mounting support; means for selectively moving the locking means to position the locking mechanism in either the locking or nonlocking position; the floor support including an upwardly projecting tube having a round outer surface about which the intermediate portion of the band extends; the seat mounting support including a seat frame on which the overcenter locking means is mounted; the locking means including a locking member pivotally supported on the frame about a first axis and also including a link having a first end pivoted to the locking member about a second axis and a second end connected to one end of the band; a pawl mounted on the seat frame and selectively movable between locking and nonlocking positions with respect to the support tube by movement of the locking member so as to cooperate with the band in preventing movement of the seat frame about the support tube; and the band and tube have aligned openings that receive the pawl in the locking position and the pawl being mounted on the locking member for movement therewith between its locking and nonlocking positions.

10. In a vehicle seat support assembly including a floor support and a seat mounting support pivotal on the floor support about a generally vertical axis to change the orientation of a seat supported thereby with respect to the associated vehicle, a locking mechanism comprising: an elongated generally flexible band having opposite ends and an intermediate portion that extends about one of the supports; overcenter locking means mounted on the other support and connected to the opposite ends of the band; said locking means being movable to move the mechanism between a first overcenter locking position where the band is tensioned about the one support to prevent pivotal movement of the seat mounting support and a second nonlocking position where the band tension is reduced relative to the locking position so as to allow the pivotal movement of the seat mounting support; means for selectively moving the locking means to position the locking mechanism in either the locking or nonlocking position; the floor support including an upwardly projecting tube having a round outer surface about which the intermediate portion of the band extends; the seat mounting support including a seat frame on which the overcenter locking means is mounted; the locking means including a locking member pivotally supported on the frame about a first axis and also including a link having a first end pivoted to the locking member about a second axis and a second end connected to one end of the band; a pawl mounted on the seat frame and selectively movable between locking and nonlocking positions with respect to the support tube by movement of the locking member so as to cooperate with the band in preventing movement of the seat frame about the support tube; a handle fixed on the locking member and having a pawl actuating portion; a mount that pivotally supports the pawl on the seat frame; an opening in the pawl receiving the pawl actuating portion of the handle; and openings in the band and the tube that receive the pawl in the locking position.

11. In a vehicle seat support assembly including a floor mountable support tube extending upwardly and a seat support frame pivotally supported on the tube for movement that changes the orientation of a seat supported thereby with respect to the associated vehicle, a locking mechanism comprising: an elongated generally flexible band having opposite ends and an intermediate portion that extends about the tube; a locking member pivotally supported on the frame about a first axis; a link having a first end pivotally supported on the locking member and a second end connected to one end of the band; means connecting the other end of the band to the frame; and a handle for selectively pivoting the locking member such that the mechanism moves between a locking position where the band is tensioned to prevent seat frame pivoting and a nonlocking position where the band tension is reduced relative to the locking position to allow the seat frame to pivot; the link being located in the locking position such that a line between the ends thereof is overcenter of the first axis about which the locking member pivots; the intermediate band portion including a bight section projecting away from the tube; a pair of clamping members between which the band bight section is received; and a threaded member extending between the clamping members to clamp the bight section and thereby tension the band.

12. In a vehicle seat support assembly including a floor mountable support tube extending upwardly and a seat support frame pivotally supported on the tube for movement that changes the orientation of a seat supported thereby with respect to the associated vehicle, a locking mechanism comprising: an elongated metallic band having opposite ends and an intermediate portion that extends about the tube; the intermediate band portion having a bight section of a U shape whose closed end projects away from the tube; a locking member, a vertical pin pivotally supporting the locking member on the frame about a first axis; a link having a first end pivotally supported on the link about a second axis, a curved intermediate link portion extending around the pin that supports the locking member, and a second link end connected to one end of the band; a tensioner including a pair of clamping members between which the band bight section is received and a threaded member extending between the clamping members to clamp the bight section and thereby control the band length; and a handle for moving the locking member about the first axis to position the mechanism in either a locking position where the band is tensioned about the tube to prevent seat frame pivoting by positioning of the link with the ends thereof overcenter with respect to the first axis and a nonlocking position where the band tension is reduced relative to the locking position to permit the seat frame to pivot on the tube, and the threaded member of the tensioner being threadingly adjustable to position the clamping members such that the band is sufficiently tensioned in the locking position to prevent seat frame pivoting.

13. An assembly as in claim 12 further including a pawl mounted on the seat frame for movement between locking and nonlocking positions with the mechanism and openings in the intermediate portion of the band and the tube that are aligned upon proper seat positioning and receive the pawl in the locking position.

14. A vehicle seat support assembly comprising: a base adapted to be mounted on a vehicle floor and having an upwardly extending support tube with an upper end having a round outer surface; a seat support frame including upper and lower horizontal frame members pivotally supported on the upper end of the tube for movement about a generally vertical axis that changes the orientation of a seat supported thereby with respect to the associated vehicle; an elongated generally flexible band having opposite ends and an intermediate portion extending about the outer surface of the tube between the upper and lower frame members; the band having a bight section of a U shape whose closed end projects away from the tube; a locking member; a vertical pin extending between the upper and lower frame members and supporting the locking member therebetween for movement about a first vertical axis between locking and nonlocking positions; a link having a first link end pivotally supported on the locking member about a second vertical axis that moves during locking member movement, a curved intermediate link portion extending around the pin that supports the locking member, and a second link end connected to one end of the band; a tensioner including a pair of clamping members between which the band bight section is received and a threaded member extending between the clamping members to provide clamping of the bight section and consequent control of the band length; and a handle for moving the locking member about the first axis to selectively position the locking member in either the locking position where the band is tensioned about the tube by positioning of the link ends overcenter with respect to the first axis to thereby prevent seat frame pivoting and a nonlocking position where the band tension is reduced relative to the locking position to permit the seat frame to pivot on the tube, the clamping of the band bight section by the clamping and threaded members of the tensioner permitting the band to be sufficiently tensioned in the locking position to prevent seat frame pivoting.

15. An assembly as in claim 14 further including a pawl moved by the handle along with the locking member, and openings in the intermediate portion of the band and in the tube which are aligned upon proper seat position and receive the pawl in the locking position so that the pawl cooperates with the band to prevent pivoting of the seat frame.

16. An assembly as in claim 15 further including a helical spring extending between the locking member and the seat frame to bias the locking member toward the locking position.

17. An assembly as in claim 16 wherein the locking member includes upper and lower portions and a connecting web extending therebetween and a stop on the seat frame for engaging the locking member web to position the locking member in the locking position.

18. An assembly as in claim 14 further including a thrust plate secured to the upper end of the tube and including an upwardly extending positioning lug, a mounting plate secured to the upper frame member so as to receive the thrust plate therebetween and prevent vertical movement of the seat frame on the tube, and said upper frame member including an opening having spaced stop surfaces for engaging the positioning lug of the thrust plate to limit pivotal seat frame movement.

19. A vehicle seat support assembly comprising: a base adapted to be mounted on a vehicle floor and having an upwardly extending support tube with an upper end having a round outer surface; a seat support frame including upper and lower horizontal frame members pivotally supported on the upper end of the tube for movement about a generally vertical axis that changes the orientation of a seat supported thereby with respect to the associated vehicle; an elongated generally flexible band having opposite ends and an intermediate portion extending about the outer surface of the tube between the upper and lower frame members; the band having a bight section of a U shape whose closed end projects away from the tube; a locking member having upper and lower portions and a connecting web extending therebetween; a vertical pin extending between the upper and lower frame members and supporting the upper and lower locking member portions therebetween for movement about a first vertical axis between locking and nonlocking positions; a link having upper and lower portions each of which includes a first end pivotally supported on the locking member about a second vertical axis that moves during locking member movement, an intermediate portion extending around the pin that supports the locking member, and a second end connected to one end of the band; a pin extending between the upper and lower seat frame members to connect the other end of the band thereto with this other band end extending between the upper and lower portions of the link and the band wrapped about the tube for about 270°; a tensioner including a pair of clamping members between which the band bight section is received and a threaded member extending between the clamping members to thereby clamp the bight section and adjustably control the band length; a pawl pivotally mounted on the seat frame for movement between locking and nonlocking positions and having an actuating opening; openings in the intermediate band portion and the tube which are aligned upon proper seat positioning and which receive the pawl in the locking position thereof to prevent seat pivoting; a handle fixed to the locking member to provide movement thereof about the first axis so as to selectively position the locking member in either the locking position where the band is tensioned about the tube by positioning of the link ends overcenter with respect to the first axis to thereby prevent seat frame pivoting and a nonlocking position where the band tension is reduced relative to the locking position to permit the seat frame to pivot on the tube; the tensioner adjustably controlling tension of the band in the locking position by clamping of the band bight section; and the handle having a pawl actuating portion received within the actuating opening of the pawl so that handle movement concomitantly moves the locking member and the pawl between the locking and nonlocking positions.

20. A vehicle seat support assembly comprising: a base adapted to be mounted on a vehicle floor and having an upwardly extending support tube with an upper end having a round outer surface; a seat support frame including upper and lower horizontal frame members pivotally supported on the upper end of the tube for movement about a generally vertical axis that changes the orientation of a seat supported thereby with respect to the associated vehicle; a mounting plate fixed on the upper frame member and having spaced stop surfaces; a thrust plate fixed on the upper end of the tube and received between the mounting plate and the upper frame member to limit vertical seat frame movement; an upwardly extending positioning projection on the thrust plate that engages the stop surfaces to limit seat frame movement; an elongated generally flexible band having opposite ends and an intermediate portion extending about the outer surface of the tube between the upper and lower frame members; the band having a bight section of a U shape whose closed end projects away from the tube and has pointed deformations providing reinforcement thereof; a locking member having upper and lower portions and a connecting web extending therebetween; a vertical pin extending between the upper and lower frame members and supporting the upper and lower locking member portions therebetween for movement about a first vertical axis between locking and nonlocking positions; a link having upper and lower portions each of which includes a first end pivotally supported on the locking member about a second vertical axis that moves during locking member movement, an intermediate link portion extending around the pin that supports the locking member, and a second link end connected to one end of the band; a pin extending between the upper and lower seat frame members to connect the other end of the band thereto with this other band end extending between the upper and lower portions of the link and the band wrapped about the tube for about 270°; a tensioner including a pair of clamping members between which the band bight section is received and a threaded member extending between the clamping members to thereby clamp the bight section and adjustably control the band length; a pawl pivotally mounted on the seat frame for movement between locking and nonlocking positions and having an elongated actuating opening; openings in the intermediate band portion and the tube which are aligned upon proper seat positioning and which receive the pawl in the locking position thereof to prevent seat pivoting; a handle for moving the locking member about the first axis to selectively position the locking member in either the locking position where the band is tensioned about the tube by positioning of the link ends overcenter with respect to the first axis to thereby prevent seat frame pivoting and a nonlocking position where the band tension is reduced relative to the locking position to permit the seat frame to pivot on the tube; the handle having a pawl actuating portion received within the actuating opening of the pawl to move the pawl along with the locking member between the locking and nonlocking positions; a stop on the seat frame that engages the connecting web of the locking member in the locking position to hold the locking member against the impetus of band tension which is adjustable via the tensioner to ensure prevention of seat frame pivoting; and a biasing spring that normally moves the locking member to the locking position.

* * * * *

UNITED STATES PATENT AND TRADEMARK OFFICE
CERTIFICATE OF CORRECTION

PATENT NO. : 4,267,999
DATED : May 19, 1981
INVENTOR(S) : Russell F. Chekirda et al.

It is certified that error appears in the above—identified patent and that said Letters Patent is hereby corrected as shown below:

Column 7, line 53, "opening" should read -- openings --.

Column 8, line 45, after "second" insert -- band --.

Column 9, line 15, "a" should read -- A --.

Column 9, line 32, "stengthening" should read -- strengthening--.

Column 9, line 37, "206" should read -- 306 --.

Claim 5, line 52, after "mounting" insert -- support --.

Signed and Sealed this

Twenty-seventh Day of October 1981

[SEAL]

Attest:

GERALD J. MOSSINGHOFF

*Attesting Officer*  *Commissioner of Patents and Trademarks*